UNITED STATES PATENT OFFICE.

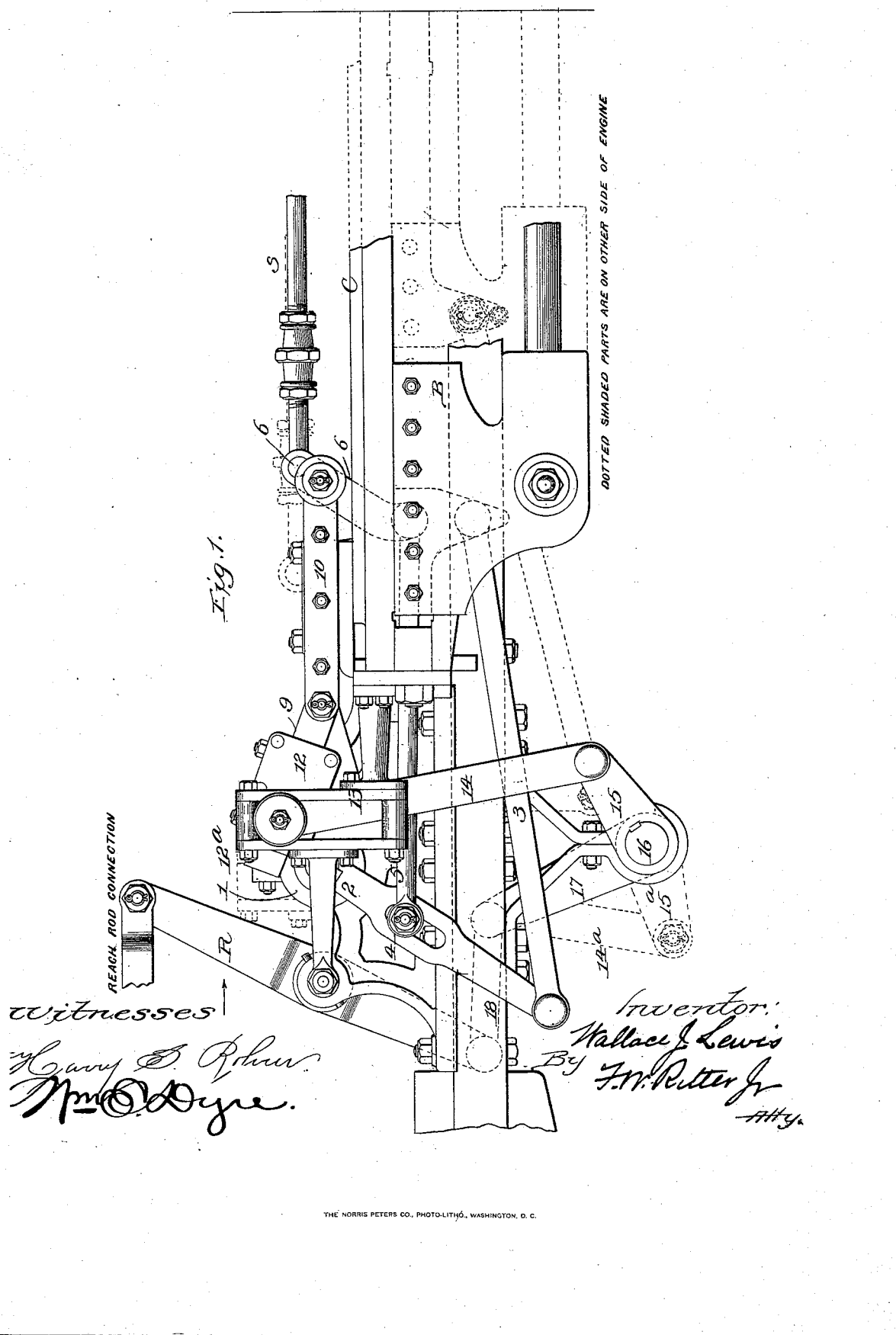

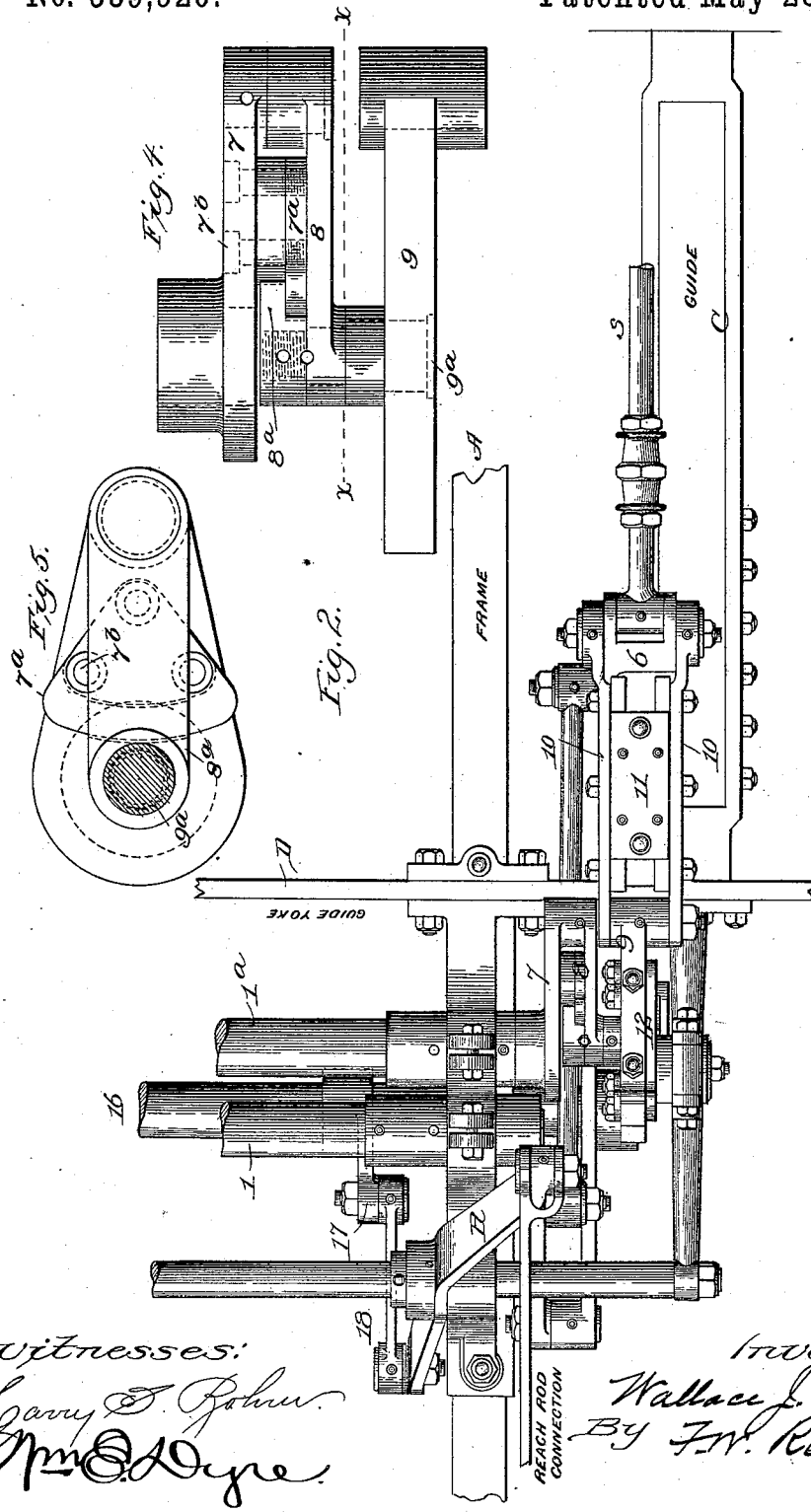

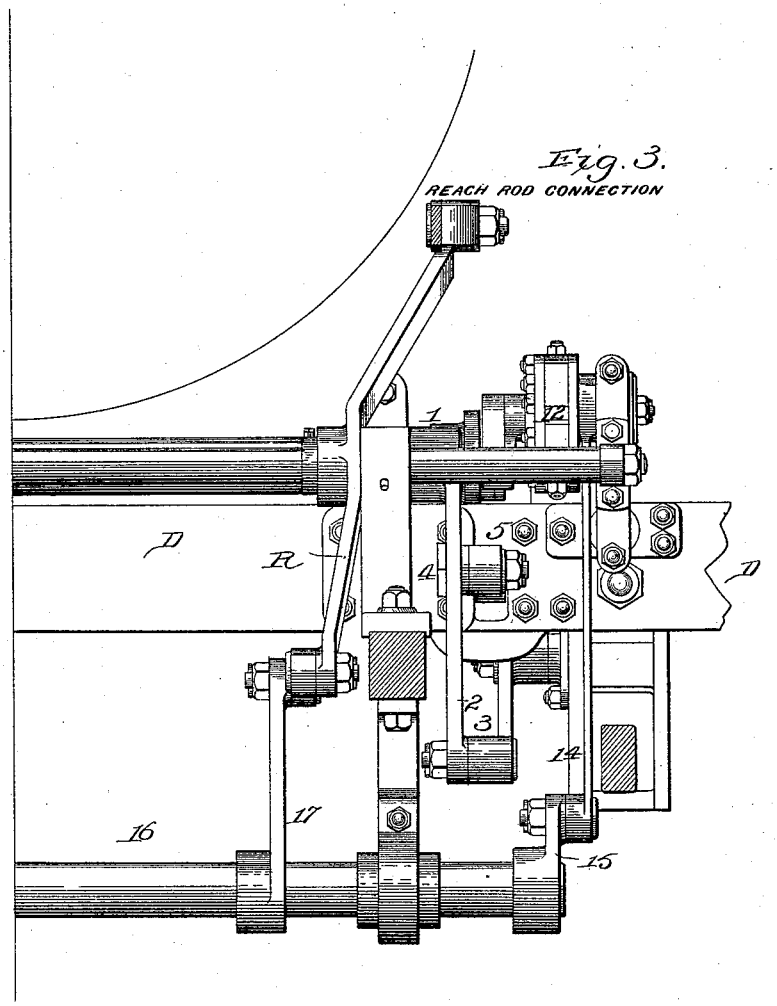

WALLACE J. LEWIS, OF ST. LOUIS, MISSOURI, ASSIGNOR TO THE LEWIS VALVE GEAR COMPANY, OF ILLINOIS.

VALVE-GEAR.

SPECIFICATION forming part of Letters Patent No. 539,920, dated May 28, 1895.

Application filed August 25, 1894. Serial No. 521,322. (No model.)

*To all whom it may concern:*

Be it known that I, WALLACE J. LEWIS, residing in the city of St. Louis, State of Missouri, have invented certain new and useful Improvements in Valve-Gear; and I hereby declare the following to be a full, clear, and exact description of the same, reference being had to the accompanying drawings, in which—

Figure 1 is a side elevation of valve-gear embodying my invention, together with so much of the parts with which it is connected as is necessary to an understanding of the construction and operation of my devices. Fig. 2 is a plan view of the devices shown in Fig. 1; and Fig. 3 is a rear elevation of the parts shown in Fig. 1, looking in the direction of the arrow. Fig. 4 is a detail enlarged plan view of the rocker-arm 7, link 8, and sliding bar 9, and the interengaging flanges $7^a$ and $8^a$. Fig. 5 is a sectional view in elevation, taken on the line $x\ x$ Fig. 4, showing the link 8 and rocker-arm 7 and flange $7^a$ in elevation.

Like symbols refer to like parts wherever they occur.

My present invention relates more particularly to the construction of reversing mechanism for that class of valve gear used in conjunction with the slide valves of double engines, wherein two separate lines of reciprocating motion are applied, the one to overcome the "lap and lead" of the valve, and the other to effect the "throw" of the valve.

For purposes of illustration, the valve gear as applied to the right hand side of a locomotive engine has been selected—it being understood that it has its duplicate on the left hand side of said engine—and the two separate lines of motion have been obtained from the opposite cross-heads, but I do not intend the particular application of the invention chosen to effect a limitation in the scope of the invention.

Illustrations of valve gears of the class referred to may be found in the patent of F. B. Matton, No. 285,286, and my own patents, Nos. 331,799 and 355,770. The lines of reciprocating motion generated by such engines have respectively the same rate of travel, but as the motion of the two pistons of the double engine are not synchronous, being separate in time approximately by half the period of a stroke, so the two lines of motion which are combined to operate the slide valve of each engine have the same period of complete reciprocation, but are separate in time by half of that period. The object of combining these two motions, which have the same period but are not synchronous, is to produce a resultant reciprocation by which the slide valve may be operated with a varying rate of movement more favorable to the expansive action of steam in the cylinders than is possible with the ordinary link motion.

The function of the valve being to regulate the alternate admission and discharge of steam at each end of the cylinder the valve is accordingly set so as to be at a point beyond the middle of its travel—the required "lap and lead"—when the piston is at the beginning of its stroke, and in coming to said position the valve overcomes the "lap and lead" so that the steam may fill the clearance space at the beginning of the stroke of the piston.

In order to work effectually and economically, either with full boiler pressure or expansively, it is desirable that over the middle portion of its travel the movement of the valve should be accelerated and for the remainder of its travel the movement of the valve should be retarded, and the longer the retarded movement can be maintained, consistent with the next following rapid movement, the better will be the results.

The object of accelerating the slide-valve during the middle portion of its travel is to quickly overcome the lap and lead and open the induction port (the same movement opening for the exhaust at the other end of the cylinder), and the object of retarding the movement of the slide valve during the remainder of its stroke is to obtain the full expansive energy of the steam. In order to effect this proportional and regulated acceleration and retardation of the valve travel, the two separate lines of reciprocating motion, hereinbefore referred to, are each connected at different points to the same floating lever so that a third point of said lever will yield the required varying reciprocal motion to the slide valve. The action of said two movements upon the floating lever, and thereby upon the valve, is so adjusted that when the reciprocal motion derived from the opposite side is in "mid-gear," or at the middle point of its movement, the movement derived from the near side will give the slide-valve a motion sufficient to overcome the "lap and lead." Hence it is usual to say in speaking of this class of gear that the valve receives its "lap and lead" from its own side, and its "throw" from the opposite side.

In double engines, where a reversal of travel or rotation is required, as in locomotive or marine engines, it is necessary to incorporate in the valve gearing some mechanism which without interfering with the construction and operation of the gearing as hereinbefore specified, will accomplish the reversal of the piston when desired. To this end, the main feature of my invention, generally stated, embraces the combination with the valve, a floating lever for operating the valve, and means for actuating the floating lever at different points at the same rate of travel, though not synchronously, of a slide bar, and a movable guide box therefor, said two latter elements being interposed between the floating lever and the means which imparts the "throw" to the valve, whereby the reversal of the engines may be easily and readily effected.

A second feature of my invention, embraces an adjustable connection between the floating lever which actuates the valve, and the means for imparting the movement to overcome the "lap and lead" whereby the lead may be increased or decreased at will.

There are other minor features of invention, all as will hereinafter more fully appear.

I will now proceed to describe my invention more fully so that others skilled in the art to which it appertains may apply the same.

In the drawings A indicates a portion of one side of the frame; B, the cross-head of said side; C, the cross-head guide, and D the guide yoke which couples the cross-head guides of the opposite sides of a locomotive.

Extending transversely of the locomotive and properly journaled on its frame, are two rock shafts 1 and 1ª, the first of which—(1) receives its motion from the right hand cross-head B (or equivalent moving element) and transmits it to the opposite or left hand piston valve to effect the "throw" thereof, and the second of which (1ª) receives its motion from the left hand cross-head (or equivalent moving element) and transmits it to effect the "throw" of the right hand valve—said rock shafts thus coupling and combining the duplicate valve gear of opposite sides.

The rock shaft 1 (shown in the drawings) is provided with a lever 2 the lower end of which is connected with the cross-head B of the right hand side of the engine by means of a rod 3, and said lever 2 is provided at or near its middle with an elongated slot wherein is adjustably secured a thimble 4 in which is journaled one end of a rod 5 the opposite end of which is pivoted to the lower end of a floating lever 6, the opposite end of said floating lever 6 being pivotally connected with the valve stem s of the right side or right hand valve, the right hand valve thus receiving from the right hand cross-head B (or its engine) the motion which overcomes its "lap and lead," and as the rod 5 is adjustably connected with the lever 2 it is evident that the lead of said valve may be increased or decreased by a proper adjustment between the parts 2 and 5.

It is to be understood that the parts of the valve gear thus far described have their equivalents—or counterparts—the valve gear for the valve on the left hand side of the engine, and that through said parts the second rock shaft 1ª is operated from the cross-head on the left hand side of the engine (or the opposite engine as the case may be). To the near end of said rock shaft 1ª is secured a rock arm 7 connected at its outer end by a pin with the corresponding end of a link or arm 8 and thence through suitable connections with the floating lever 6 at a point between the connection of stem s and rod 5, whereby the motion of the opposite cross-head or that on the left hand side of the locomotive (or equivalent means) is utilized to effect the "throw" of the valve of the right hand side, and to accelerate its movement during the middle portion of its travel.

In practical use of the devices it has been found that there is a tendency in the link or arm 8 to flare away from the rock arm 7, to correct which I provide the parts 7 and 8 with inter-engaging flanges or guide flanges 7ª and 8ª (see Figs. 4 and 5, Sheet 2) the flange 7ª being preferably of segmental form, off-set from arm 7 and secured thereto by screws or bolts 7ᵇ or equivalent means, while the flange 8ª is preferably arc shaped and may be a portion of the nut which secures the pivot pin 9ª of sliding bar or slide link 9.

For the purposes of a reversing mechanism, the connection between rock arm 7 and floating lever 6 is preferably of the following construction—that is to say—the link or arm 8 which is pivoted to arm 7 is at its other end pivoted to a slide bar or slide-link 9 which slide-bar or link is in turn pivotally connected with the parallel link 10, and the latter is connected with the floating lever 6, as before specified. Link 10, slides horizontally in a bracket 11 secured to the guide yoke D, and the slide-link 9 is arranged to slide in the guide block or guide box 12, vertically movable in a vertical guide bracket 13, also secured to the guide yoke D or some suitable portion of the frame A. The vertically movable guide block 12 (one for each side or engine) is connected by a rod 14 with an arm 15 on a rock shaft 16, which rock shaft is in turn connected with the reversing lever R by means of an arm 17 and link 18 or equivalent means. The arm 15ª—(shown in dotted line Fig. 1)—for the guide block 12ª on the left hand side (said guide block also shown in dotted line Fig. 1) projects from rock shaft 16 in a substantially opposite direction, so that the reversing mechanism of opposite sides substantially counter-balance each other and render the manipulation of the reversing mechanism comparatively light and easy work for the engineer.

From the foregoing description of the device it will be apparent to one skilled in the art that the valve receives two motions, one from its own engine through the rod 3, lever 2, rod 5 and floating lever 6, and the other from the opposite engine through rock shaft 1ª, arm 7, link or arm 8, sliding links 9 and 10 and floating lever 6. It will also be apparent that the raising of guide box or guide-block 12 on the right side above the center line is accompanied by the corresponding lowering of guide box or guide-block 12ª on the left side, thus making one side balance the other. This will put the engine in forward motion, while the reverse movement reverses the engine or results in a back motion.

When in a central position or "mid-gear," the center line of the pivot pin which connects arm 8 to slide link 9 coincides with the center or axial line of shaft 1ª and the nearer said center is approached the shorter will be the "cut off."

It should be noted that by throwing the pivot pin which connects the lower end of the floating lever 6 and the rod 5 out of line the admission of steam in each end of the cylinder may be equalized for all "cut offs."

Having thus described my invention, what I claim, and desire to secure by Letters Patent, is—

1. In combination with valve gear having a floating lever for operating the valve and two sets of means for actuating the floating lever, said actuating means having the same rate of travel but separate as to time, of a slide bar and slide-box interposed between the floating lever and the means which imparts the "throw" to said lever and valve; substantially as and for the purposes specified.

2. In combination with a valve gear having a floating lever for operating the valve and two sets of means for actuating the floating lever, said actuating means having the same rate of travel but separate as to time, of a slide and movable slide-box interposed between the floating lever and the means which imparts the "throw" to said lever and valve, and an adjustable connection interposed between the means which imparts the lead to said valve and the floating lever aforesaid; substantially as and for the purposes specified.

3. In combination with a valve gear having a floating lever for actuating the valve and two sets of means for actuating the floating lever, said actuating means having the same rate of travel but separate as to time, of a slide bar, a slide-box therefor, and a second slide link and guide therefor interposed between the means which impart the "throw" to the valve and the floating lever which actuates the valve; substantially as and for the purposes specified.

4. In combination with a valve gear having a floating lever for operating the same, two rock shafts one having the slotted arm, and adjustable connection with said floating lever, and the other having a slide bar arranged in a movable slide box, and a link connection with the floating lever, said latter link connection having a fixed guide or guide bracket; substantially as and for the purposes specified.

5. In a valve gear mechanism, the combination with the slide valve and rock shaft, of an interposed rock-arm, link, and sliding bar, said rock arm and link having inter-engaging flanges; substantially as and for the purposes specified.

In testimony whereof I affix my signature, in presence of two witnesses, this 22d day of August, 1894.

WALLACE J. LEWIS.

Witnesses:
THEO. E. PARKER,
JNO. HARROLL.